(12) United States Patent
Hawley

(10) Patent No.: US 7,571,947 B2
(45) Date of Patent: Aug. 11, 2009

(54) DEVICE AND METHOD FOR EXTENDING TRUCK CARGO SPACE

(76) Inventor: Ronald Hawley, 24452 Co. Rd. 9, Winona, MN (US) 55987

( * ) Notice: Subject to any disclaimer, the term of this patent is extended or adjusted under 35 U.S.C. 154(b) by 0 days.

(21) Appl. No.: 11/843,037

(22) Filed: Aug. 22, 2007

(65) Prior Publication Data

US 2008/0048465 A1 Feb. 28, 2008

Related U.S. Application Data

(60) Provisional application No. 60/839,328, filed on Aug. 22, 2006.

(51) Int. Cl.
*B60P 7/06* (2006.01)
(52) U.S. Cl. ............... 296/26.11; 296/26.08; 296/57.1; 296/37.6
(58) Field of Classification Search ............. 296/26.08, 296/26.11, 57.1, 37.6
See application file for complete search history.

(56) References Cited

U.S. PATENT DOCUMENTS

| | | | |
|---|---|---|---|
| 4,531,773 A | | 7/1985 | Smith |
| 5,133,584 A | | 7/1992 | McCleary |
| 5,156,432 A | | 10/1992 | McCleary |
| 5,468,038 A | * | 11/1995 | Sauri ........................ 296/57.1 |
| 5,732,995 A | | 3/1998 | Piccariello |
| 5,775,480 A | | 7/1998 | Lapeyre et al. |
| 5,788,311 A | * | 8/1998 | Tibbals ........................ 296/62 |
| 5,826,932 A | | 10/1998 | DeSimone |
| 5,941,588 A | * | 8/1999 | Marconi ................... 296/26.11 |
| 6,045,172 A | | 4/2000 | Thomas et al. |
| 6,179,360 B1 | * | 1/2001 | Davian ........................ 296/50 |
| 6,257,637 B1 | * | 7/2001 | Reed ........................ 296/26.08 |
| 6,276,738 B1 | | 8/2001 | Marshall |
| 6,378,926 B1 | * | 4/2002 | Renze et al. ............. 296/26.11 |
| 6,540,123 B1 | * | 4/2003 | Kmita et al. ................ 224/403 |
| 6,626,478 B1 | | 9/2003 | Minton |
| 6,676,182 B2 | * | 1/2004 | Fitts ........................ 296/26.11 |
| 6,746,066 B2 | * | 6/2004 | Reed ........................ 296/26.08 |
| 6,811,067 B2 | * | 11/2004 | Muizelaar et al. ........... 224/404 |
| 6,957,840 B1 | | 10/2005 | Endres |
| 6,994,389 B1 | * | 2/2006 | Graffy et al. ............. 296/26.11 |
| 7,021,689 B1 | * | 4/2006 | Weisbeck, III ........... 296/26.11 |
| 7,182,380 B2 | * | 2/2007 | Nagle ...................... 296/26.11 |

(Continued)

*Primary Examiner*—Glenn Dayoan
*Assistant Examiner*—Gregory Blankenship
(74) *Attorney, Agent, or Firm*—Altera Law Group, LLC

(57) ABSTRACT

The present invention extends the truck bed, thus increasing cargo space by the length of the truck tailgate. One embodiment of the invention comprises rotatably attaching an end panel to the tailgate, with rotatable and storable support members. Another embodiment comprises right and left side panels rotatably attached to the end panel. When the assembly is stored, either the support members or the side panels are rotated inward to rest against the inner surface of the end panel and the end panel is rotated downwardly and secured against the upper surface of the tailgate. When the assembly is deployed, the end panel is unsecured from the tailgate and is rotated upwardly until approximately perpendicular with the tailgate and the cargo space bed. The support members or side panels are rotated outwardly and secured to complete deployment. In certain embodiments, the end panel may be removed easily and quickly, or lowered down and out of the way, to allow and facilitate loading of longer items in the cargo space, and then reattached and deployed. The mounting bracket and/or end panel may comprise molded reinforced plastic composite material.

16 Claims, 15 Drawing Sheets

U.S. PATENT DOCUMENTS 7,264,292 B1 * 9/2007 Summers .................. 296/26.11
7,287,798 B2 * 10/2007 King .......................... 296/57.1
7,413,231 B1 * 8/2008 Wood et al. ............... 296/26.11

* cited by examiner

DEVICE AND METHOD FOR EXTENDING TRUCK CARGO SPACE

RELATED APPLICATION DATA

This application claims priority to U.S. provisional patent application No. 60/839,328, filed Aug. 22, 2006.

BACKGROUND OF THE INVENTION

1. Field of the Invention

The present invention is directed to a device and method for extending the length of a truck cargo space.

2. Description of the Related Art

One of the problems existing in conventional trucks (defined herein as pickup trucks, SUV's and hybrid truck/SUV's) with downwardly-folding tailgates is that of limited loading or cargo space. Conventional trucks have a cargo space limited by the dimensions of the cargo bed itself, defined by two sides, a front end and a rear end or the tailgate.

Older pickup trucks generally comprised 8 foot cargo boxes. Today, families purchase pickup trucks and use them as a second family vehicle. In order to accommodate family use, truck passenger compartments have become larger, with two rows of seats and, in some cases, four entry/exit doors. As a consequence, the cargo box is shortened, in many cases to only 6 feet long.

Many loads that are carried by a truck do not fit neatly within the truck bed, especially smaller framed trucks. Such loads are longer than the length of the truck bed and do not sit within the bed, e.g., lumber and sheetrock. Therefore, in order to properly carry such a load by the particular truck, one of two methods is generally employed.

The first known method is to simply overlay the end of the load on the top of the truck's tailgate with that portion of the load that will not fit within the bed hanging out past the back of the truck. While this method may work with some loads, it can prove to be problematic with other types of loads especially loads that have a large surface area such as lumber. As the load is angled up through the bed of the truck, winds created when driving the truck can get underneath the load and act on it creating lift and possibly lifting the load out of the truck. While tying the load down may help prevent load loss, the wind forces can still cause the load to sway dramatically.

The other primary known method of carrying an oversized load by a truck is to flip down the tailgate in order to extend the overall length of the truck so that the length is the combined length of the truck bed and the height, when closed, of the tailgate. This method allows the load to lay flat within the pickup truck bed and helps minimize load loss problems due to wind forces. However, this method can result in the load falling off the back of the truck when accelerating or moving up a steep incline.

In order to address this problem, gate-attached extension systems have been proposed that place a physical barrier at the end of the extended truck bed. These devices extend the side walls of the truck bed and also form the back wall that was previously formed by the tailgate in its up position. While these prior art devices tend to work well for their intended purpose, they suffer from one or more drawbacks.

For example, such devices are very complex in design and construction, making them expensive to manufacture and relatively difficult to install and use. Other prior art devices are relatively bulky so that when they are installed, the available cargo space is diminished.

Therefore, there exists a need in the art for a device that extends a truck bed when the tailgate is flipped down to increase the overall cargo space by increasing the length of the truck bed. Such a device must be of relatively simple design and construction so that the device is relatively inexpensive to manufacture and install and is relatively easy to use and maintain. In addition, the device must be relatively compact in design such that once installed within the pickup truck, minimal cargo capacity is lost within the truck bed both when the inventive device is stored as well as deployed.

BRIEF SUMMARY OF THE INVENTION

The present invention extends the truck bed, thus increasing cargo space by the length of the truck tailgate. One embodiment of the invention comprises rotatably attaching an end panel to the tailgate, with rotatable and storable support members. Another embodiment comprises right and left side panels rotatably attached to the end panel. When the assembly is stored, either the support members or the side panels are rotated inward to rest against the inner surface of the end panel and the end panel is rotated downwardly and secured against the upper surface of the tailgate. When the assembly is deployed, the end panel is unsecured from the tailgate and is rotated upwardly until approximately perpendicular with the tailgate and the cargo space bed. The support members or side panels are rotated outwardly and secured to complete deployment. In certain embodiments, the end panel may be removed easily and quickly, or lowered down and out of the way, to allow and facilitate loading of longer items in the cargo space, and then reattached and deployed.

An object of the present invention provides a device and method for extending the functional cargo space of a truck box.

Another object of the present invention provides a device and method for storing the truck bed extension assembly to avoid diminishing the unextended storage capacity of the truck box.

Another object of the present invention provides a device and method for deploying the truck bed extension assembly to maximize the extended storage capacity of the truck box.

Another object of the present invention provides a device and method for allowing the end panel to be moved out of the way to allow and facilitate loading of longer materials.

Another object of the present invention provides a device and method for allowing the end panel to be moved out of the way to allow and facilitate loading of longer materials, then moving the end panel back into the deployed position.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

Figure 1:
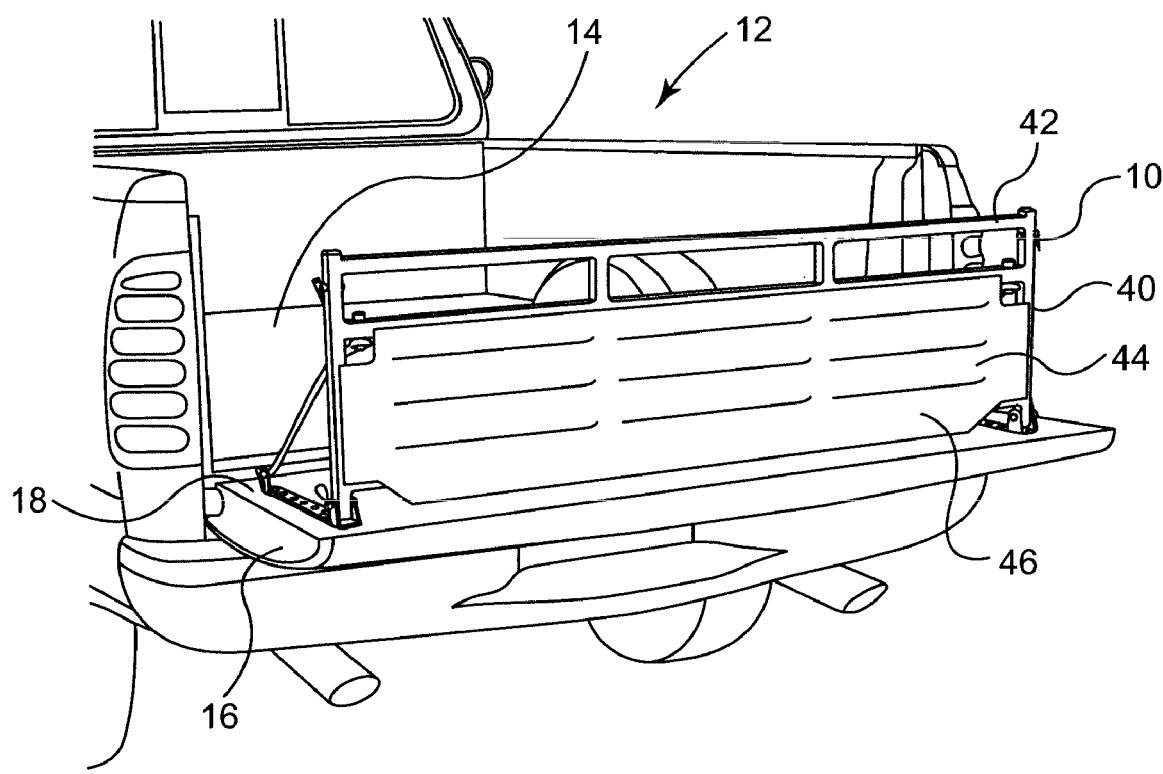
FIG. 1 is a rear perspective of the tailgate extension assembly in a deployed position.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

With specific reference to FIG. 1, a truck cargo space extension device 10 is provided and illustrated installed on a truck 12 and in a deployed position. The extension device 10 is illustrated in FIG. 1 in the deployed or open position, thus extending or lengthening the truck cargo space 14 by approximately the length of the tailgate 16.

As illustrated in the Figures, right and left mounting brackets 20, 22 are attached to the tailgate 16 using known methods, e.g., precut holes 24 provided along mounting brackets 20, 22 that accommodate fasteners 25, e.g., standard ¼" bolts and washers, to fasten and secure the mounting brackets 20, 22 to the tailgate 16. Specifically, the mounting brackets 20, 22 are secured and attached to the tailgate inner surface 18.

FIG. 2 best illustrates the mounting brackets 20, 22 comprising end panel mounting tabs 26, each end panel mounting tab 26 having a raised securing aperture 27 therethrough and defining a channel 28 between the end panel mounting tabs 26. Mounting brackets 20, 22 further comprise right and left side support arm tabs 30, 32, each support arm tab 30, 32 further defining a side support arm aperture 34 therethrough.

The Figures illustrate one embodiment of an end panel 40 comprising a frame 42 and a frame cover 44 having an inner surface 45 and an outer surface 46. Frame 42 comprises right and left upper ends 47, 48, each upper end 47, 48 comprising a storage aperture 49 therethrough. Frame 42 further comprises right and left lower mounting ends 50, 51 having channel bracket apertures 52, 53 therethrough. Right and left side support arm retainer clips 58, 59 are attached on the frame cover inner surface 46. Frame further comprises a cross member 57 that defines right and left side support arm securing apertures 54, 55 therethrough.

Figure 3:
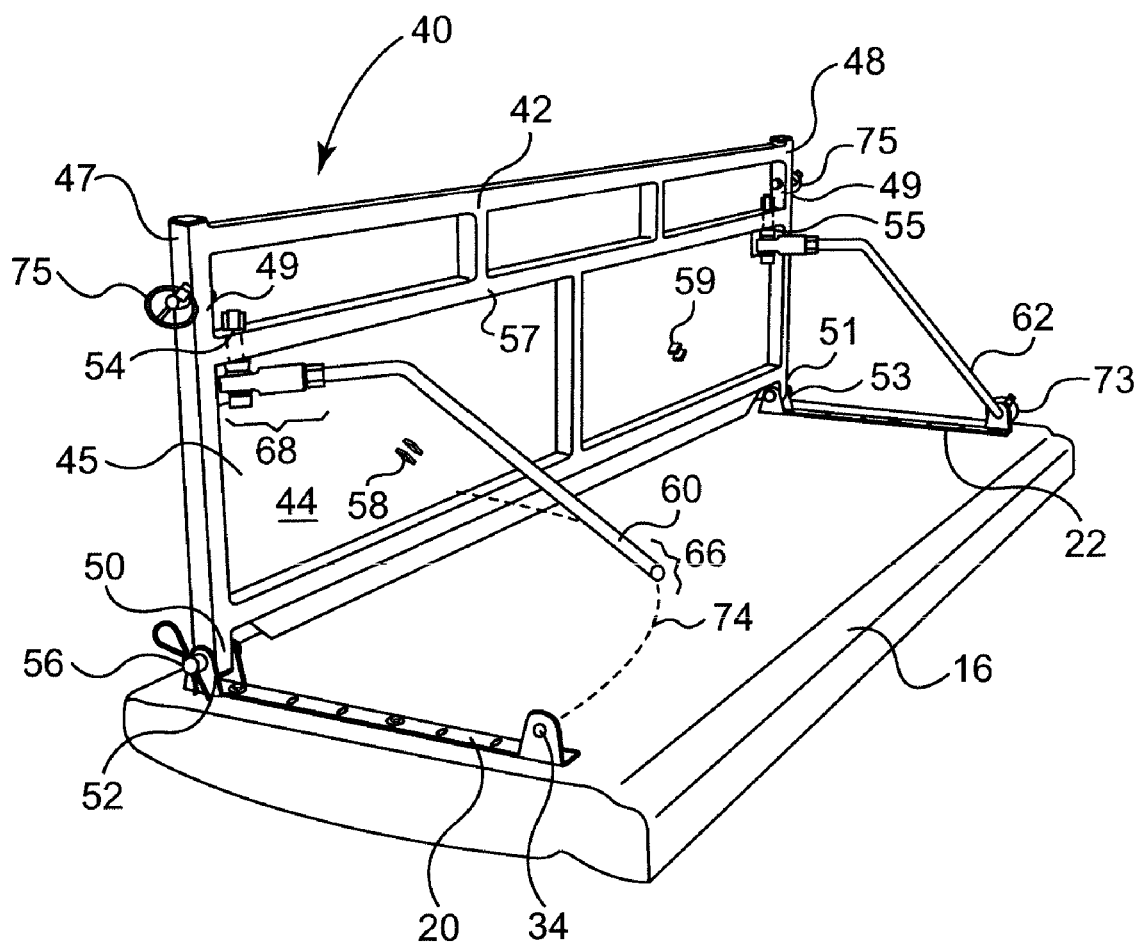
FIG. 3 is a perspective of one embodiment of the present invention is a deployed position with one side support arm disengaged.

As best illustrated by FIGS. 1 and 3, end panel 40 is rotatably attached to mounting brackets 20, 22 by inserting each mounting end 50, 51 into the appropriate mounting bracket channel 28, wherein the channel bracket mounting apertures 52, 53 of frame 42 align with the appropriate mounting tab securing aperture 27. A securing mechanism 56, as illustrated a clevis pin and hitch pin clip, allow rotatable engagement of end panel 40 with mounting brackets 20, 22 via engagement with mounting bracket securing apertures 27 and the frame's right and left channel bracket apertures 52, 53. Those skilled in the art will recognize additional equivalent securing mechanisms in addition to the clevis pin and hitch pin clip arrangement 56 illustrated in the figures. Each such equivalent securing mechanism is within the scope of the present invention.

Figure 2A:
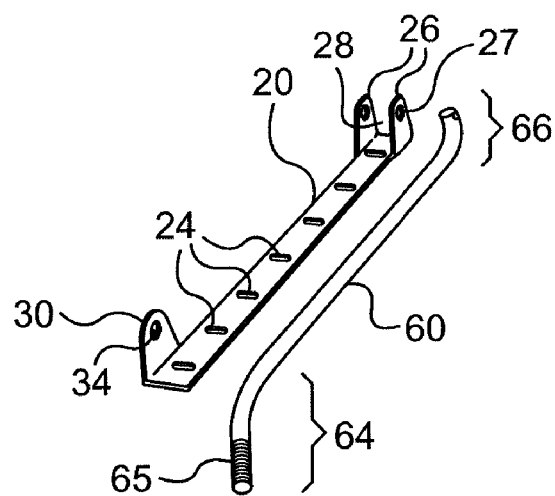
FIGS. 2A and 2B are perspective views of the right and left mounting brackets and right and left side support arms.
Figure 2B:
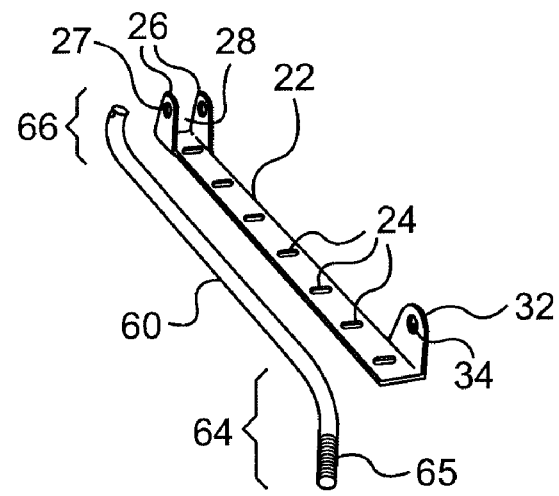

Right and left side support arms 60, 62, best seen in FIGS. 2A, 2B and 3, are rotatably secured by known methods to right and left side support arm securing apertures 54, 56. As shown, the side support arms 60, 62 are provided with an upper angled section 64 and a lower angled section 66. At least a portion of the upper angled section 64 comprises threads 65. Moreover, the side support arms 60, 62 are attached to the right and left support side support arm securing apertures 54, 56 by means that allow the support member arms 60, 62 to be adjusted in two dimensions relative to the end panel 40 prior to competing installation to accommodate varying tailgate 16 sizes and installation preferences. Further, support member arms 60, 62 may be rotated inward toward tailgate 16 to facilitate deployment and storage.

Figure 4:
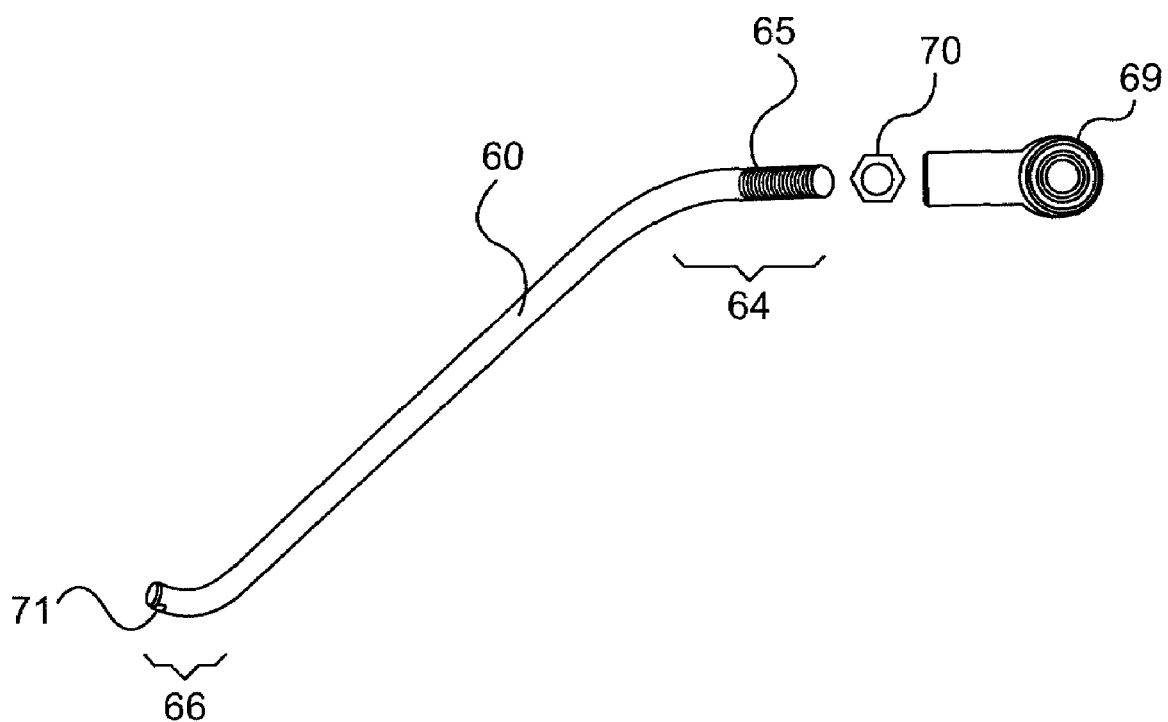
FIG. 4 is an exploded view of a side support arm, spherical rod end connector and jam nut.

Such flexibility of installation, storage and deployment is achieved in the illustrated embodiment by use of a spherical rod end connector assembly 68, e.g., a Heim® joint assembly, to connect the right and left side support arms 60, 62 to the right and left side support arm securing apertures 54, 56, the spherical rod end connector assembly 68 being well-known to those skilled in the art. As illustrated, the spherical rod end connector assembly 68 is rotatingly attached to the frame 42 at right and left side support arm securing apertures 54, 55 using methods and mechanisms well known to those skilled in the art. As seen in FIG. 4, the spherical rod end connector 69 threadedly engages the threads 65 on the upper angled section 64 of the side support arms 60, 62. A jam nut 70 is provided on each side support arm 60, 62 adjacent the spherical rod end connector 69 to either fix the rotational position or allow free threaded rotation of the side support arms 60, 62 within the spherical rod end connector assembly 68 when jam nut 70 is tightened or loosened, respectively. Threadingly rotating the side support arms 60, 62 clockwise within the spherical rod end connector 69 effectively shortens the length of the side support arm while threadingly rotating the side support arms 60, 62 counterclockwise within the effectively lengthens the side support arm to assist in installation. The length of each side support arm 60, 62 may be lengthened or shortened in order to allow the lower angled section 66 of each arm 60, 62 to engage the side support arm aperture 34 within each mounting bracket 20, 22. The angle of end panel 40 deployment, approximately 90 degrees or perpendicular to the open tailgate 16 in the typical installation and deployment, may also be adjusted by lengthening or shortening the side support arms 60, 62 within the spherical rod end connector assembly 68.

Once the side support arms 60, 62 are installed with proper length within the spherical rod end assembly 68, the support arms 60, 62 may be rotatingly extended outwardly and away from the inner surface of the frame cover 46. This rotating movement is indicated in FIG. 3 by dashed line 74. The side support arms 60, 62 may be rotated within the spherical rod end connector assembly 68 to allow the lower angled section 66 of each support arm 60, 62 to engage the mounting brackets 20, 22 at the support arm apertures 34. The lower angled section 66 further comprises a securing aperture 71 therethrough to accommodate a securing pin 73, e.g., a hood pin or the equivalent, to secure the right and left side support arm 60, 62 to the mounting bracket 20, 22 within side support arm apertures 34.

As discussed above, side support arms 60, 62 may be screwed into or out of spherical rod end connector assembly 68 to adjust, i.e., shorten or lengthen, the support arms 60, 62, to enable the end panel 40 to stand approximately perpendicular to the tailgate 16. The angle of the end panel 40 with respect to the tailgate 16 may be varied by either tightening or loosening the support arms 60, 62 within the spherical rod end connector assembly 68. When the desired length of the support arms 60, 62 has been achieved, jam nut 69 may then be tightened to fix the support arms 60, 62 rotational positions with respect to the spherical rod end connector assembly 68.

Figure 5:
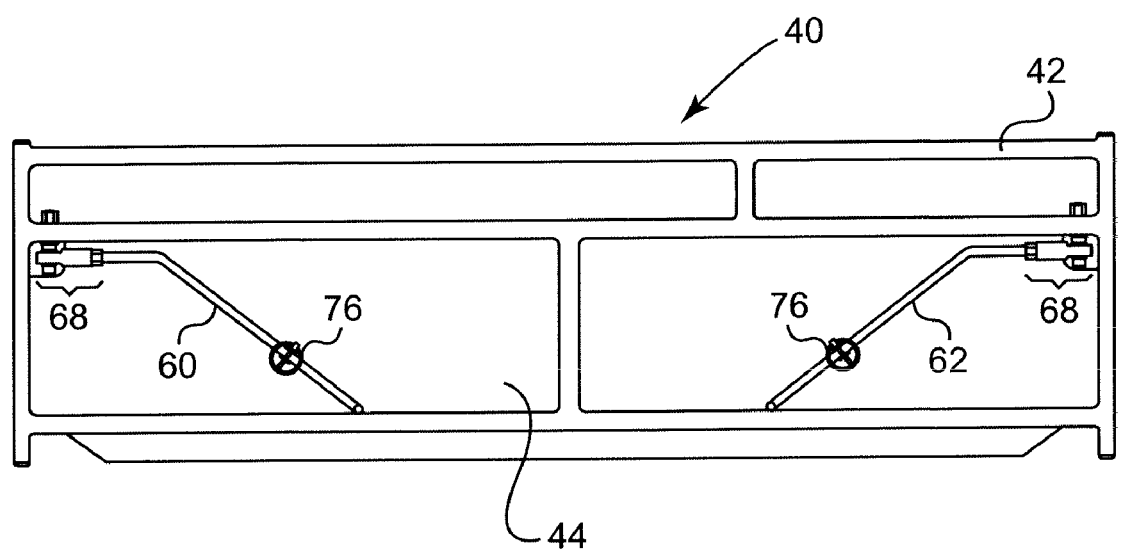
FIG. 5 illustrates one embodiment of the present invention configured for storage.

Storing the device 10 may be achieved by initially removing the storage pins 75 from the frame's storage apertures 49. The storage pins 75 as illustrated comprise a well-known arrangement of a clevis pin combined with a securing pin such as a hood pin. Once the storage pins 75 are removed from both storage apertures 49, the side support arms may be prepared for storage. Thus, securing pin 73 may be removed to allow disengagement of each lower angled section 66 from right and left support arm apertures 34, 36, respectively. After such disengagement, the side support arms 60, 62 may be rotated inwardly toward the appropriate retainer clip 58, 59 and removably secured by pressing the support arm into securing attachment with the appropriate retainer clip as best seen in FIGS. 3 and 5. A hood clip 76 may be used to secure the side support arms 60, 62 within the retainer clips 58, 59.

Figure 6:
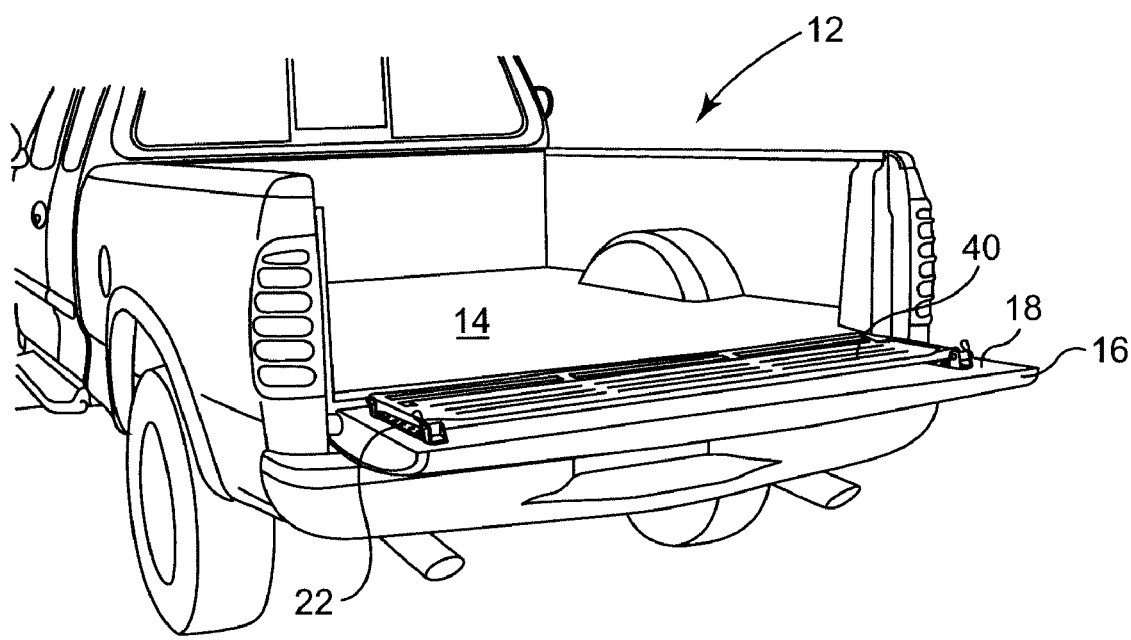
FIG. 6 illustrates one embodiment of the present invention in stored position on the tailgate.

Referring now to FIGS. 3 and 6, the end panel 40 may then be rotated downwardly toward the tailgate 16, wherein the frame's storage apertures 49 substantially align with the right and left side support arm apertures 34. Storage pins 75 may then fixedly engage the side support arm apertures 34 and the storage apertures 49 and may thus secure the end panel 40 in the stored position. FIG. 6 illustrates one embodiment of the present invention in the stored position.

Additional embodiments of the device 10 may comprise mounting brackets 20, 22 that comprise various materials, e.g., metal and/or reinforced plastic composites introduced into the appropriate molding machine by processes that are well known in the art. End panel 40 may also comprise such reinforced plastic composite material.

Figure 7A:
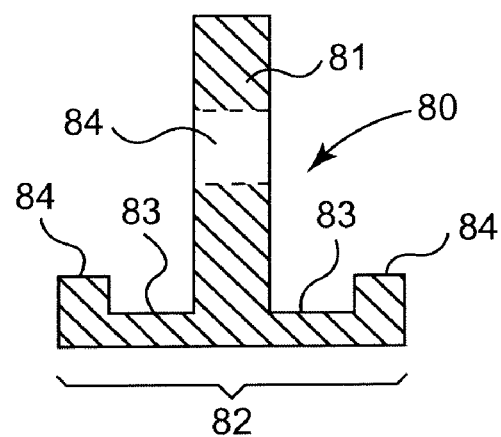
FIG. 7A and 7B provide one embodiment of a mounting bracket and end panel attachment.

One particular embodiment of mounting brackets 20, 22 may comprise a well-known L-bracket 80 as shown in FIG. 7A, the bracket having a raised center section 81 rising from a base 82 comprising recessed sections 83 adjacent the center section 81, each recessed section 83 ending distally in a lip 84. Center section 81 comprises an aperture 84 therethrough and may be mounted via base 82 to the inner surface of tailgate 16 by methods and mechanisms well known to those skilled in the art.

Figure 7B:
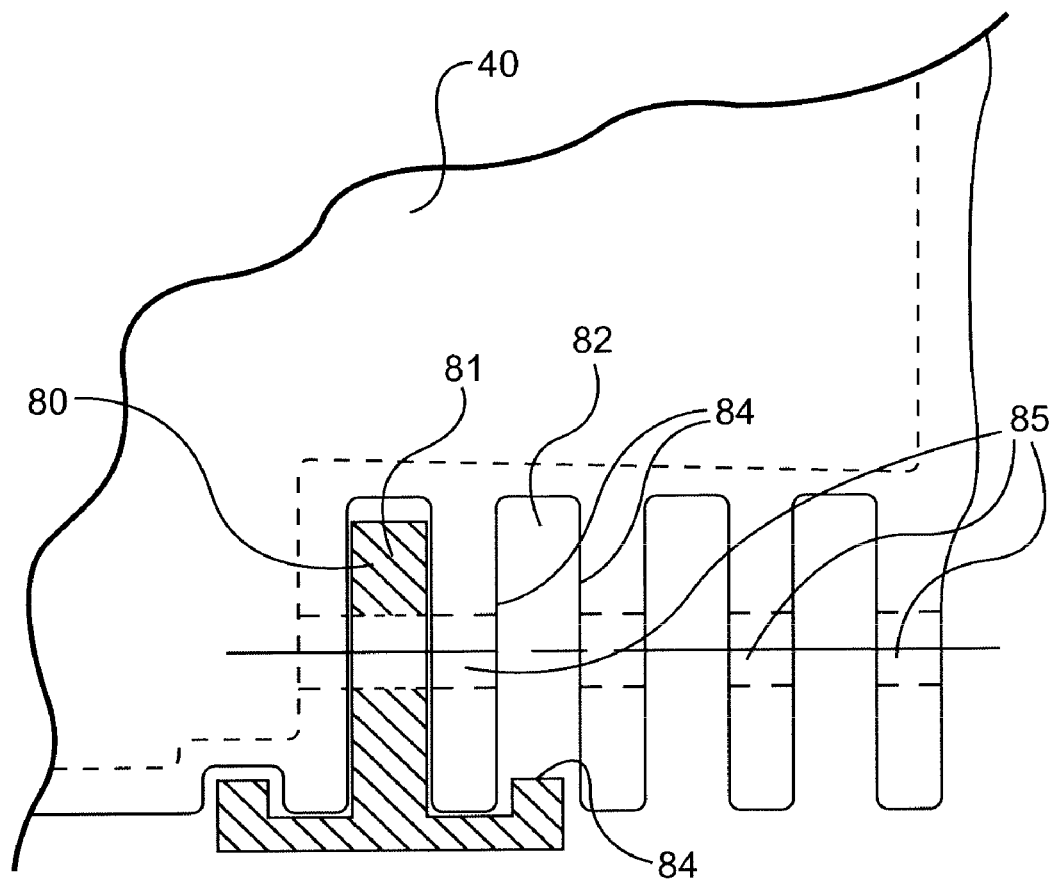

As seen in FIG. 7B, an alternate embodiment of the end panel may define at least one mounting slot 82, the at least one mounting slot 82 having opposing walls 84 which engage the mounting bracket 80. The opposing walls 84 further comprise an aperture 85 therethrough which substantially align with the L-bracket aperture to allow a securing bolt (not shown) to engage the mounting slot aperture(s) 82 and the L-bracket aperture to allow a rotating attachment of the end panel 40 with respect to the L-bracket 80 and the tailgate 16. Those skilled in the art will recognize that the number of mounting slot(s) 82 provided on the right and left sides of the end panel 40 may vary. For example, the left side may comprise only one mounting slot 82 while the right side may comprise more than one, e.g., four, mounting slots 82. Alternatively, both the right and left sides of the end panel 40 may comprise more than one mounting slot 82. Providing more than one mounting slot allows the installer flexibility in installation of the mounting brackets on tailgates of varying manufacturers/models and, as a result, may comprise profiles that are not consistent across manufacturer or model of vehicle.

As discussed above, the mounting bracket and end panel embodiments illustrated in FIGS. 7A and 7B may comprise metal and/or reinforced plastic composite material. Such a construction is significantly lighter than a solid metal, or partial metal, end panel which can be significant when raising or lowering the end panel during deployment or storage. The plastic molded product, while lighter, is also sufficiently strong to handle relatively heavy loads and impacts. Further, the molding process allows much flexibility in the structure itself, e.g., rub rails may be provided on the inner and/or outer surface of the end panel to provide protection for labeling and the like contained in recessed pockets. In addition, as will be discussed further below, recesses may be formed within the inner surface of the end panel to accept mounting brackets and/or side support arms when the device is stored to minimize the stored profile height of the device.

Figure 8:
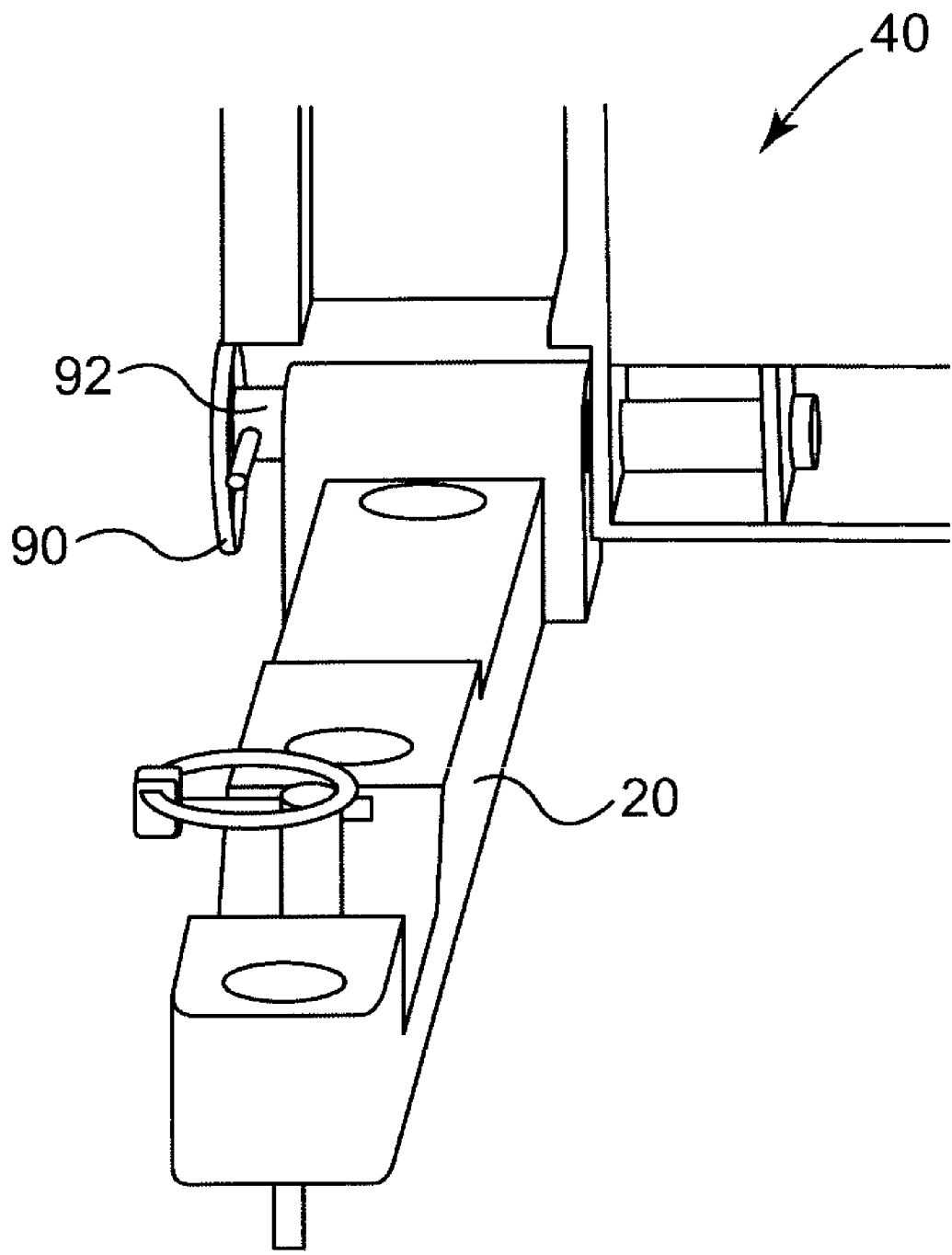
FIG. 8 illustrates one embodiment of a reinforced molded plastic composite mounting bracket with hinged connection to a reinforced molded plastic composite end panel.
Figure 9:
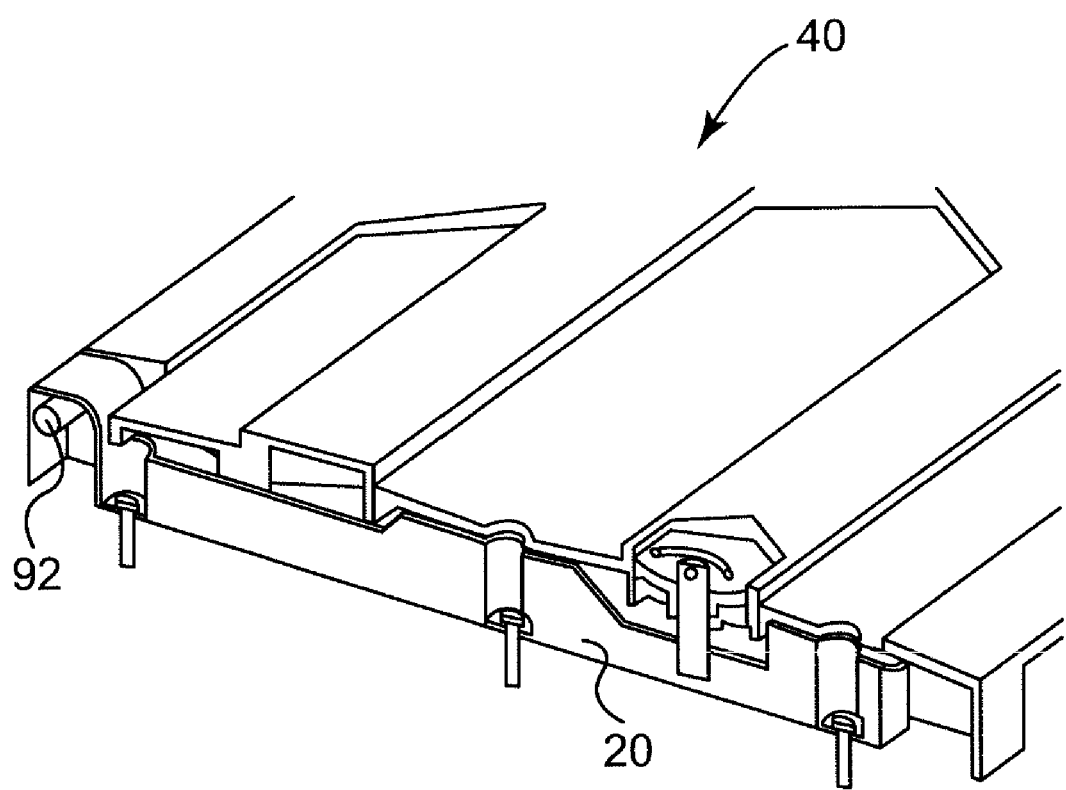
FIG. 9 is a partial cutaway view of one embodiment of a reinforced molded plastic composite mounting bracket with hinged connection to a reinforced molded plastic composite end panel in the stored position with the mounting bracket received within a molded recess of the end panel.

Thus, another embodiment for the mounting bracket 20, 22 and end panel 40 may comprise a reinforced plastic composite mounting bracket 20, 22 bolted to the tailgate 16 by methods well known in the art and as illustrated as being hingedly attached to end panel 40 in FIG. 8. Thus, mounting bracket 20, 22 may comprise an aperture 90 capable of engaging a securing pin 92, e.g., a standard 4½" clevis pin. The securing pin 92 may further engage the end panel aperture as illustrated in the Figure to allow secure hinging action of the end panel 40. The molded reinforced plastic composite end panel 40 comprises mounting bracket recesses that are complementary with the mounting brackets 20, 22, so that when the end panel 40 is lowered for storage, the mounting brackets 20, 22 are received within the end panel mounting bracket recesses to ensure a low profile during storage. FIG. 9 shows the molded composite end panel in partial cutaway view in the stored position, with the right mounting bracket 20 fully engaged within the complementary mounting bracket recess.

The side support arms described above may be employed with the reinforced plastic composite embodiment embodiment with the side support arms 60, 62 rotating inwardly on the spherical rod end connector assembly 68 toward preformed recesses (not shown) on the inner surface of the plastic composite end panel 40 for storage.

End panel 40 as described herein may also comprise a variety of constructions, e.g., a frame cover 44 constructed of a metal mesh material, secured onto frame 42 may be provided. Such a construction reduces wind resistance during travel when the end panel 40 is in the deployed position by allowing air to travel through the openings in the mesh. Alternatively but similarly, the frame 42 may support a frame cover 44 comprising a matrix of straps that may comprise columns and rows of interwoven straps as those skilled in the art will readily recognize. Straps may be formed of any natural or manmade material that provides sufficient strength to maintain attachment with frame 42, e.g., and without limitation, straps may be formed of nylon, polypropylene and the like.

Figure 10:
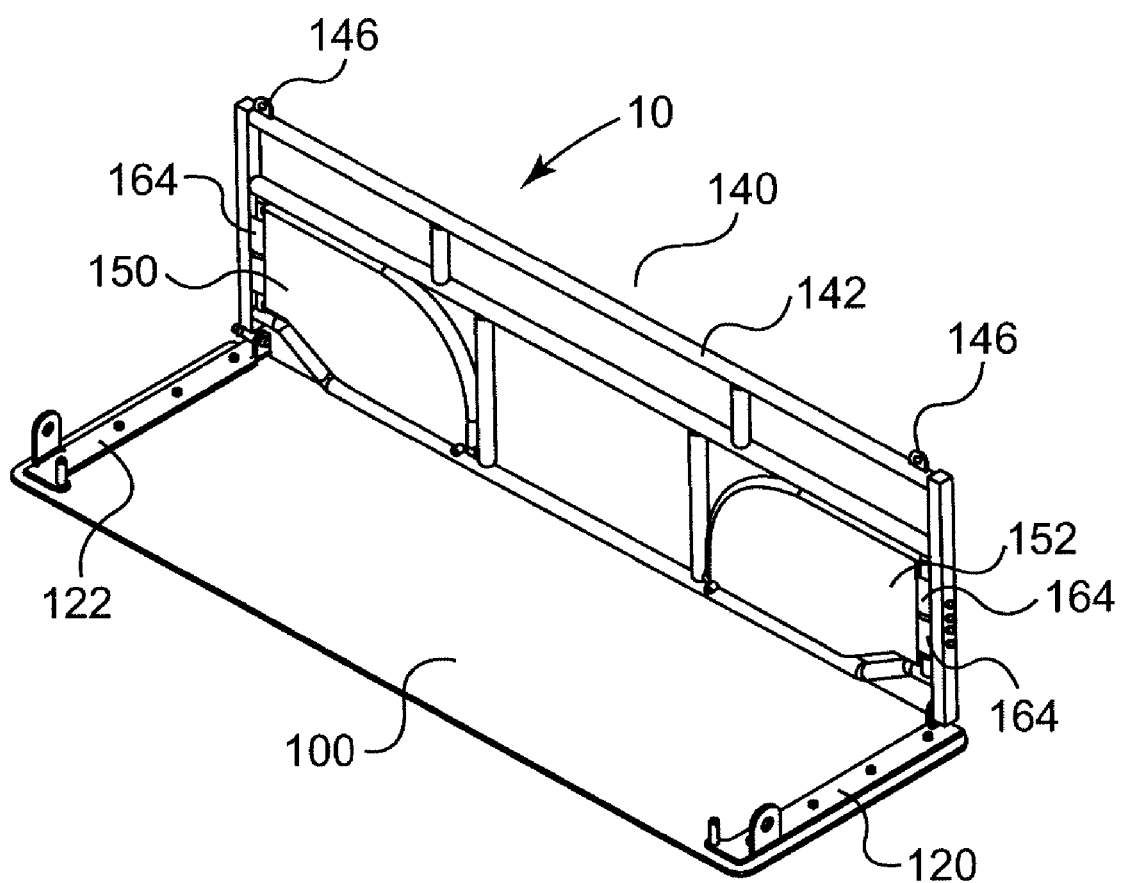
FIG. 10 illustrates one embodiment of the present invention.

Further, device 10 may comprise additional embodiments. Thus, as shown in FIGS. 10 and 11, a mounting plate 100 may be fastened to a stock OEM truck tailgate by appropriate fasteners, the nature of which will be readily apparent to those skilled in the art. The mounting brackets 20, 22 described above may then be attached and secured to the mounting plate 100. Mounting plate 100 may comprise a plurality of mounting holes therethrough, alternatively, the installer may drill holes through in the appropriate positions to best accommodate installation on a particular tailgate.

An alternate embodiment of the inventive device 10 is illustrated in FIGS. 10 through 15. In this alternate embodiment, left and right mounting brackets 120, 122, respectively are provided with end panel 140, comprising frame 142 rotatingly attached thereto. Right and left support panels 150, 152, are rotatingly mounted to frame 142.

Figure 11A:
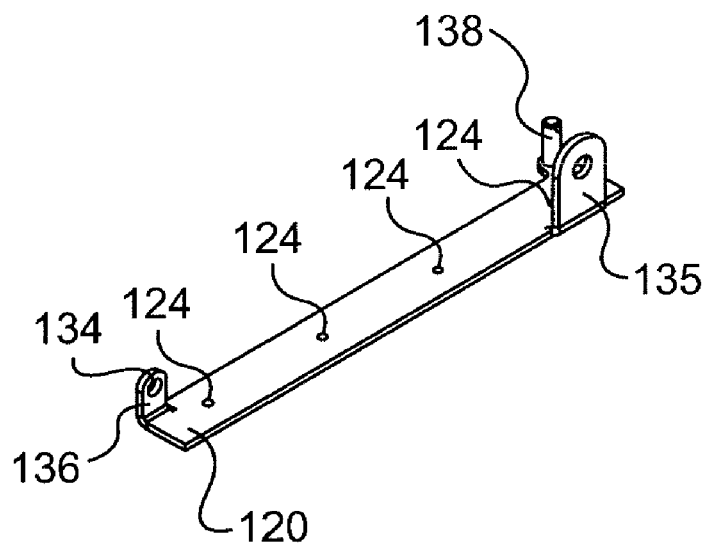
FIGS. 11A and 11B illustrate one embodiment of mounting brackets.
Figure 11B:
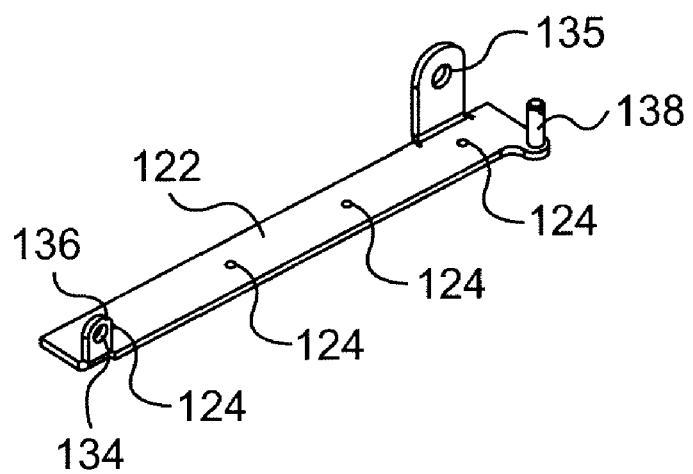

Turning to FIGS. 11A and 11B, the mounting brackets 120, 122 are shown comprising a hinge hole 134, an attachment tabs receptacle 135 and a locking peg 138. A plurality of mounting holes 124 are provided for securing the mounting brackets 120, 122 either to the tailgate 16 directly or via mounting plate 100. As the Figures suggest, the mounting bracket hinge holes 134 rotatably attach to the end panel 140, allowing the end panel 140 to rotate relative to the mounting brackets 120, 122 and the tailgate 16. As discussed above, the mounting plate 100 may be installed, but is not a necessary component for all embodiments.

Figure 12A:
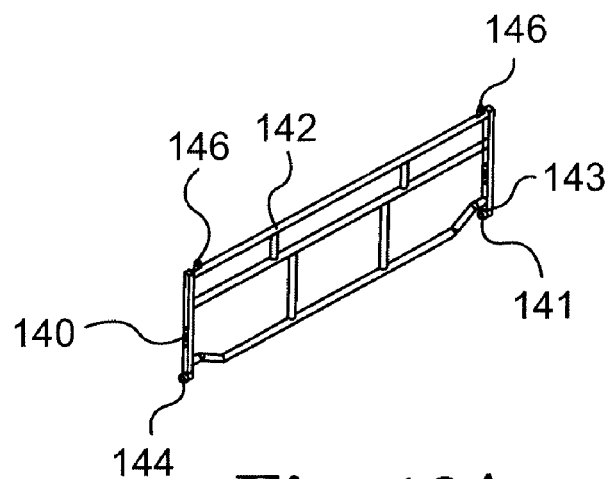
FIGS. 12A, 12B, and 12C illustrate one embodiment of the end panel and frame of the present invention.
Figure 12B:
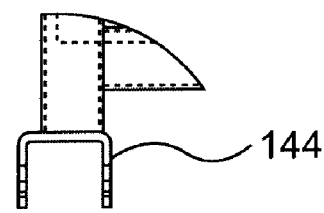
Figure 12C:
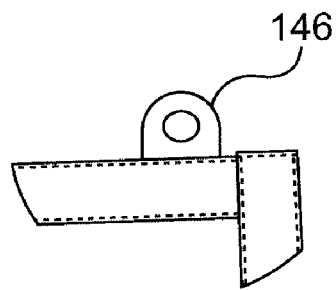
Figure 13A:
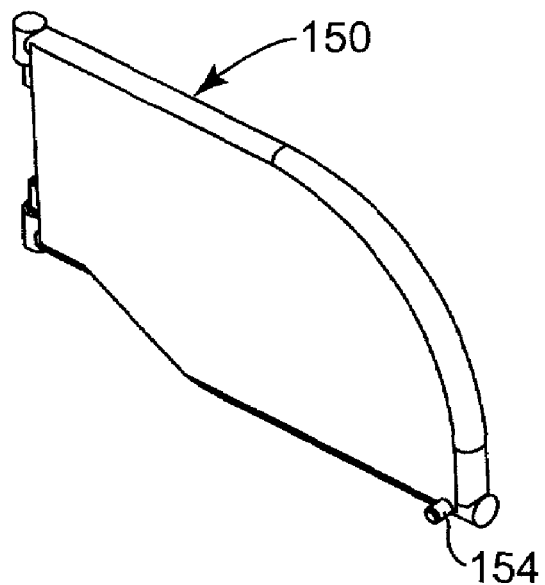
FIGS. 13A and 13B provide perspective views of one embodiment of side support panels of the present invention.
Figure 13B:
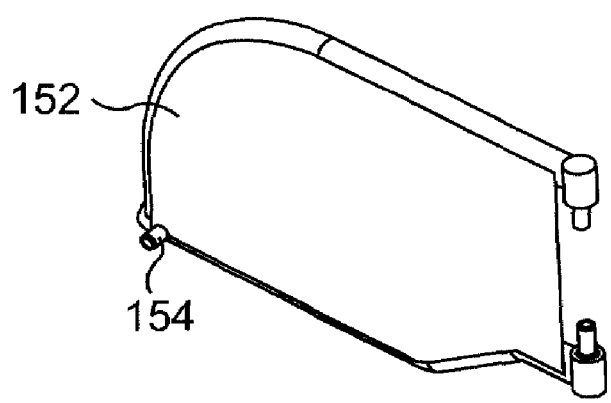

As shown in FIGS. 12A, 12B and 12C, the end panel 140 comprises ends that rotatably attach to the mounting plate hinge holes 134. The end panel 140 comprises on one such end 141, a solid pin 143 that allows rotational engagement between end 141 and hinge hole 134. On the other end of the end panel 144, the end panel 140 is adapted to allow rotatable engagement with the mounting plate 100, if used, or the tailgate 16, using a spring loaded retractable pin (not shown), that is well known to those skilled in the art. Using such a retractable pin allows for quick and easy removal of the end panel 140 from the mounting plate 100 or tailgate 16 without the use of, or need for, additional tools. The hinging aspect of this particular embodiment of the present invention also allows the end panel 140 to fold downwardly to lay flat against the mounting plate 100 or tailgate 16 during storage. Various methods of achieving the necessary rotatable engagement with the mounting plate are known to those skilled in the art and are within the scope of the present invention.

The side support arms 60, 62, together with the spherical rod end connector assembly 68 as described above may be used or alternatively, side support panels may be used to provide for a more complete enclosure in the extended region, i.e., along the sides of the tailgate 16.

One such embodiment comprises a right support panel 150 and a left support panel 152, both rotatably attached to the end panel 140, specifically to frame 142. As illustrated in the Figures, one embodiment of the present invention provides attachment of the right and left support panels 150, 152 to the frame 142 using a hinging mechanism comprising the following elements: hinge pin 162, hinge block 164 and nylon bushing 166 to achieve the rotation necessary for storage and deployment of the gate extension assembly 10.

Figure 14A:
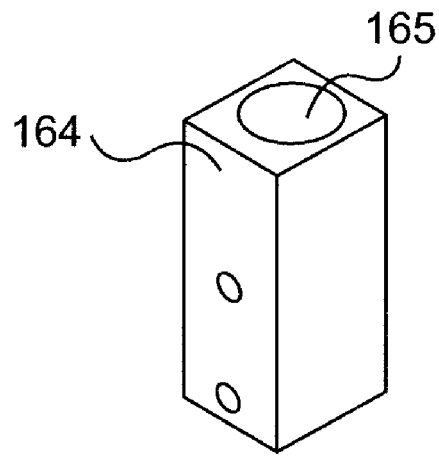
FIGS. 14A is a perspective view of the hinge block and 14B is a cutaway of the hinge block.
Figure 14B:
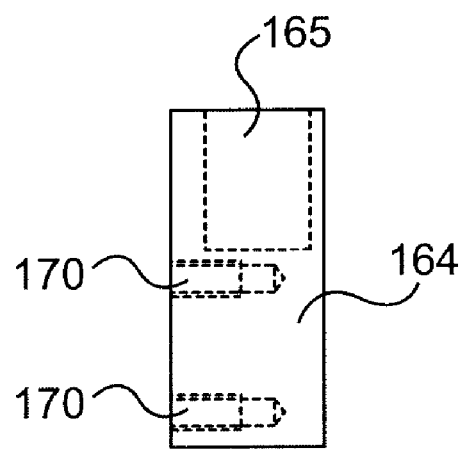
Figure 15:
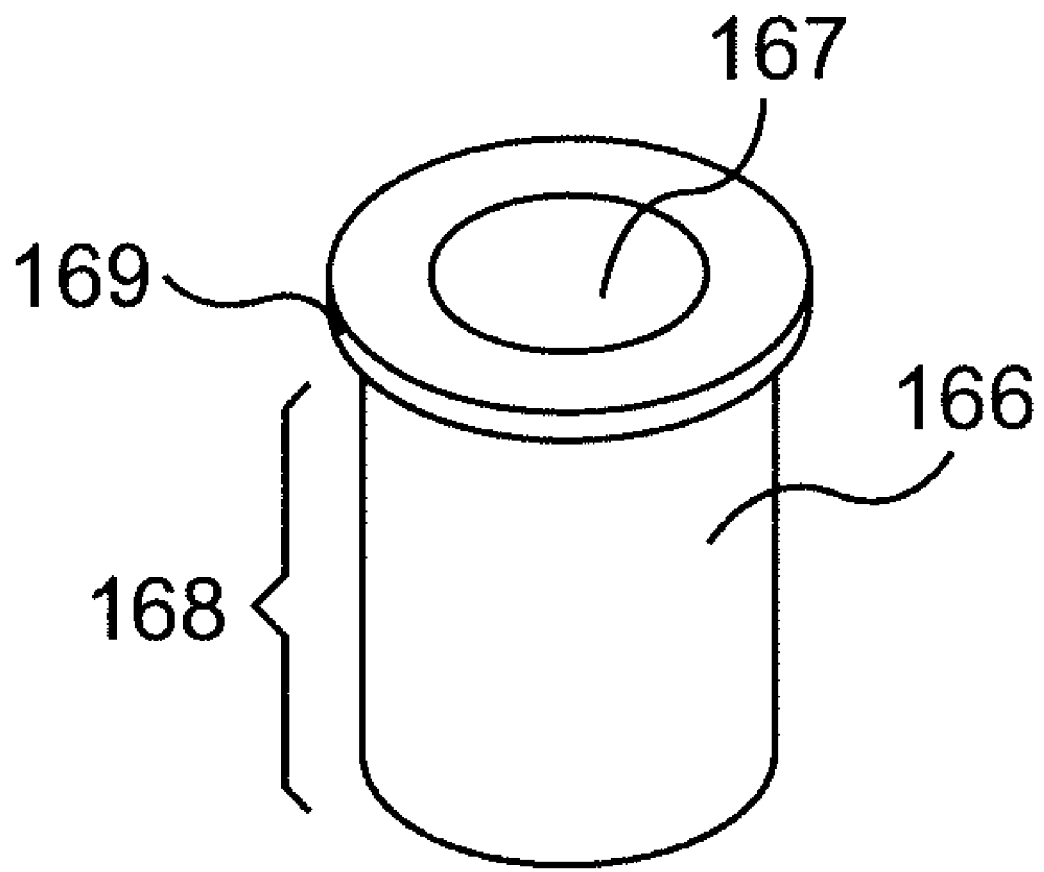
FIG. 15 illustrates the nylon bushing.

FIGS. 14A and 14B illustrate the hinge block 164 which further comprises a bushing insert 165 and two attachment openings 170 to allow the hinge block 164 to be attached to frame 142 as best shown in FIG. 10 using attachment methods and mechanisms well known and readily apparent to those skilled in the art. An exemplary nylon bushing is shown in FIG. 15, the bushing having a hinge pin insert 167, a smaller diameter section 168 and a lip 169. Smaller diameter section 168 is received by bushing insert 165 to provide a rotational mechanism for the hinge pin 162 of the side support panels 150, 152. Hinge pin 162 is received within hinge pin insert 167. As illustrated, each side support panel 150, 152 comprises two hinge pins 162, each hinge pin 162 being inserted into the hinge pin insert 167 which is, in turn, received by the hinge block's bushing insert 165. Each hinge block 164 is then attached to frame 142 as described above.

Thus, when in storage position, the right and left support panels 150, 152 may fold inward and against the frame 142. Alternatively, when in the deployed position, the hinging mechanism allows the right and left support panels 150, 152 to rotate outwardly away from frame 142 to form a substantially 90 degree angle with the end panel 140.

In addition, right and left support panels 150, 152 may comprise an attachment tab 154. When the right and left support panels 150, 152 are in the deployed position, the attachment tab 154 is received by the attachment tab receptacle 136 on the right and left side mounting brackets 120, 122, respectively to secure the support panels 150, 152.

One embodiment of the end panel 140 may comprise receptacles for the locking pegs provided on side mounting brackets 120, 122. As the end plate 140 is rotated downwardly, the locking peg receptacles 146 receive the locking pegs 138. The end panel 140 may be secured in the closed, stored position by inserting locking pins (not shown), or the equivalent, through the locking pin holes 139

It should be noted that certain embodiments of the present invention may comprise integration of the truck bed extension assembly into the truck tailgate during vehicle manufacture. In these embodiments, the device may comprise an integrated method of extending the length of the truck box or bed.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A truck cargo space extender for a vehicle having a tailgate capable of opening downwardly, comprising:

right and left mounting brackets fixedly attached to the tailgate;

an end panel comprising a frame and frame cover rotatingly attached to the right and left mounting brackets, wherein the end panel is capable of rotating upwardly into a deployed position and downwardly into a stored position;

right and left side support arms, each arm having an upper angled section comprising threads and a lower angled section, the upper angled sections in rotating engagement with the frame, the angled lower section of the right side support arm capable of removable engagement with the right mounting bracket and the angled lower section of the left side support arm capable of removable engagement with the left mounting bracket, wherein the lengths of the right side support arm and left side support arm may be adjusted.

2. The truck cargo space extender of claim 1, further comprising a spherical rod end connector assembly between the right side support arm and the frame and a spherical rod end connector assembly between the left side support arm and the frame.

3. The truck cargo space extender of claim 1, further comprising the right side support arm and the left side support arm being rotatable relative to the end panel.

4. The truck cargo space extender of claim 1, wherein the end panel comprises an angle of deployment that may be adjusted by lengthening or shortening the right side support arm and left side support arm.

5. The truck cargo space extender of claim 1, wherein the right and left mounting brackets each comprise an L-bracket and wherein the end panel comprises at least one mounting slot, the at least one mounting slot rotatingly engaging the L-bracket.

6. The truck cargo space extender of claim 1, wherein the right and left mounting brackets comprise molded reinforced plastic composite material.

7. The truck cargo space extender of claim 1, wherein the end panel comprises molded reinforced plastic composite material.

8. The truck cargo space extender of claim 7, wherein the end panel further comprises molded recesses that are complementary to the right and left mounting brackets and wherein the molded recesses receive the right and left mounting brackets when the end panel is rotated downwardly into the stored position.

9. The truck cargo space extender of claim 1, wherein the frame cover comprises metal mesh.

10. The truck cargo space extender of claim 1, wherein the frame cover comprises a matrix of straps.

11. The truck cargo space extender of claim 1, wherein the right and left mounting brackets further comprise left and right side support mounting tabs and wherein the right side support arm may be rotated outwardly away from the end panel to allow engagement of the angled lower section of the right side support arm with the right side support mounting tab, and wherein the left side support arm may be rotated outwardly away from the end panel to allow engagement of the angled lower section of the left side support arm with the left side support mounting tab.

12. The truck cargo space extender of claim 11, wherein the angled lower section of the right side support arm may be disengaged from the right side support mounting tab and the right side support arm rotated inwardly toward the end panel and secured, and wherein the angled lower section of the left side support arm may be disengaged from the left side support mounting tab and the left side support arm rotated inwardly toward the end panel and secured, and wherein the end panel with secured side support arms may be rotated downwardly toward the right and left mounting brackets and secured thereto in a stored position.

13. A truck cargo space extender for a vehicle having a tailgate capable of opening downwardly, comprising:
right and left mounting brackets attached to the tailgate, wherein each right and left mounting bracket comprises mounting holes, hinge holes, locking pegs, and an attachment tab receptacle;
an end panel rotatingly attached to the right and left side mounting bracket hinge holes and comprising locking peg receptacles for engaging the locking pegs;
right and left side support panels hingedly attached to the end panel with a hinging assembly, the right and left support panel each comprising an attachment tab, wherein the hinging assembly comprises a hinge pin, a hinge block and a nylon bushing, wherein the right and left side support panels may be rotated inwardly to fold flat against the end panel, and the end panel rotated downwardly to fold flat against the tailgate, the locking peg receptacles receiving the locking pegs and secured in stored configuration, and wherein the stored configuration may be unsecured, the end panel rotated upwardly, disengaging the locking pegs from the locking peg receptacles, to a position essentially perpendicular with the tailgate, the right and left side support panels rotated outwardly essentially perpendicular with the end panel and wherein the attachment tabs are received by the attachment tab receptacles and secured in the deployed configuration.

14. The truck cargo space extender of claim 12, further comprising a mounting plate fixedly attached to the tailgate, wherein the right and left mounting brackets are attached thereto.

15. A method for extending the cargo space of a vehicle having a downward opening tailgate, comprising:
providing right and left mounting brackets on the inner surface of the tailgate;
attaching an end panel to the mounting brackets wherein the end panel is capable of rotating downward to a stored position and upward to achieve a deployed position;
providing right and left side support arms that are rotatable relative to the end panel and that are removably engaged with the right and left mounting brackets, respectively;
removing the engagement of the right and left side support arms with the right and left mounting brackets, respectively;
rotating each side support arm inwardly toward the end panel and securing each side support arm thereto;
folding the end panel down toward the right and left mounting brackets;
securing the end panel to the right and left mounting bracket to achieve a stored position; and
providing recesses on the inner surface of the end panel, wherein the recesses are complementary in profile with the right and left mounting brackets;
folding the end panel downwardly;
engaging the right and left mounting brackets within the respective complementary recesses on the inner surface of the end panel; and
securing the end panel to the right and left mounting brackets to achieve a stored position.

16. The method of claim 15, further comprising providing an end panel comprising molded reinforced plastic composite.

* * * * *